Figure 1:
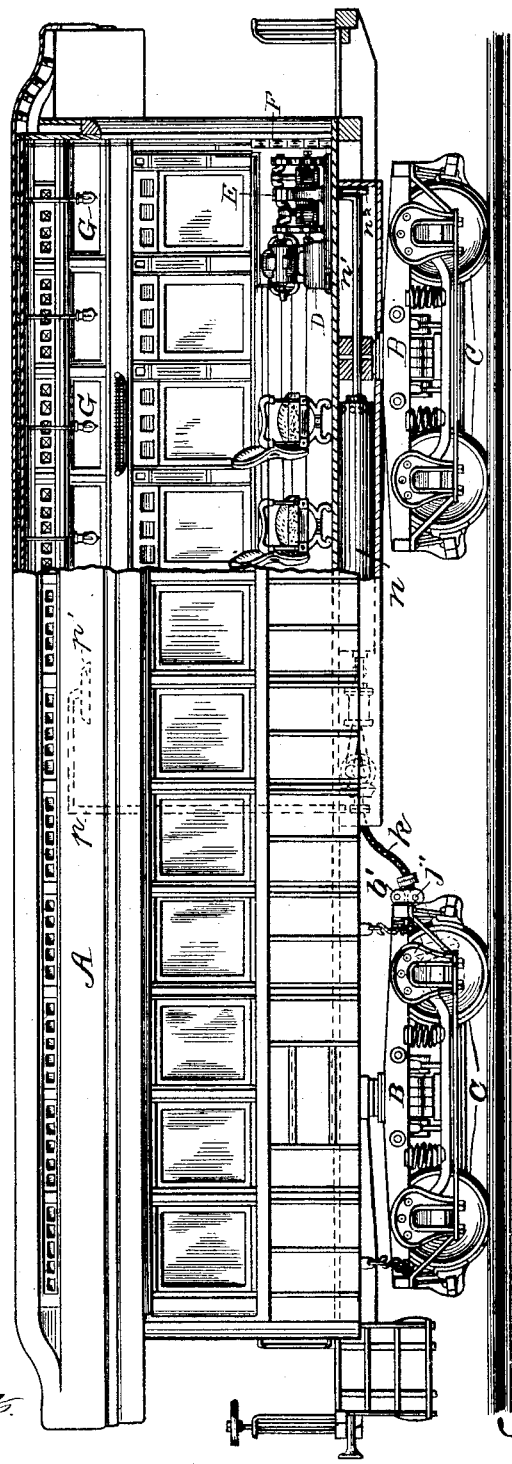

(No Model.) 2 Sheets—Sheet 1.

F. M. GARLAND.
SYSTEM OF ELECTRIC LIGHTING.

No. 462,311. Patented Nov. 3, 1891.

Witnesses:
Arthur B. Jenkins,
Albert W. Roberts.

Inventor.
Frank M. Garland,
by
Harry P. Williams,
atty.

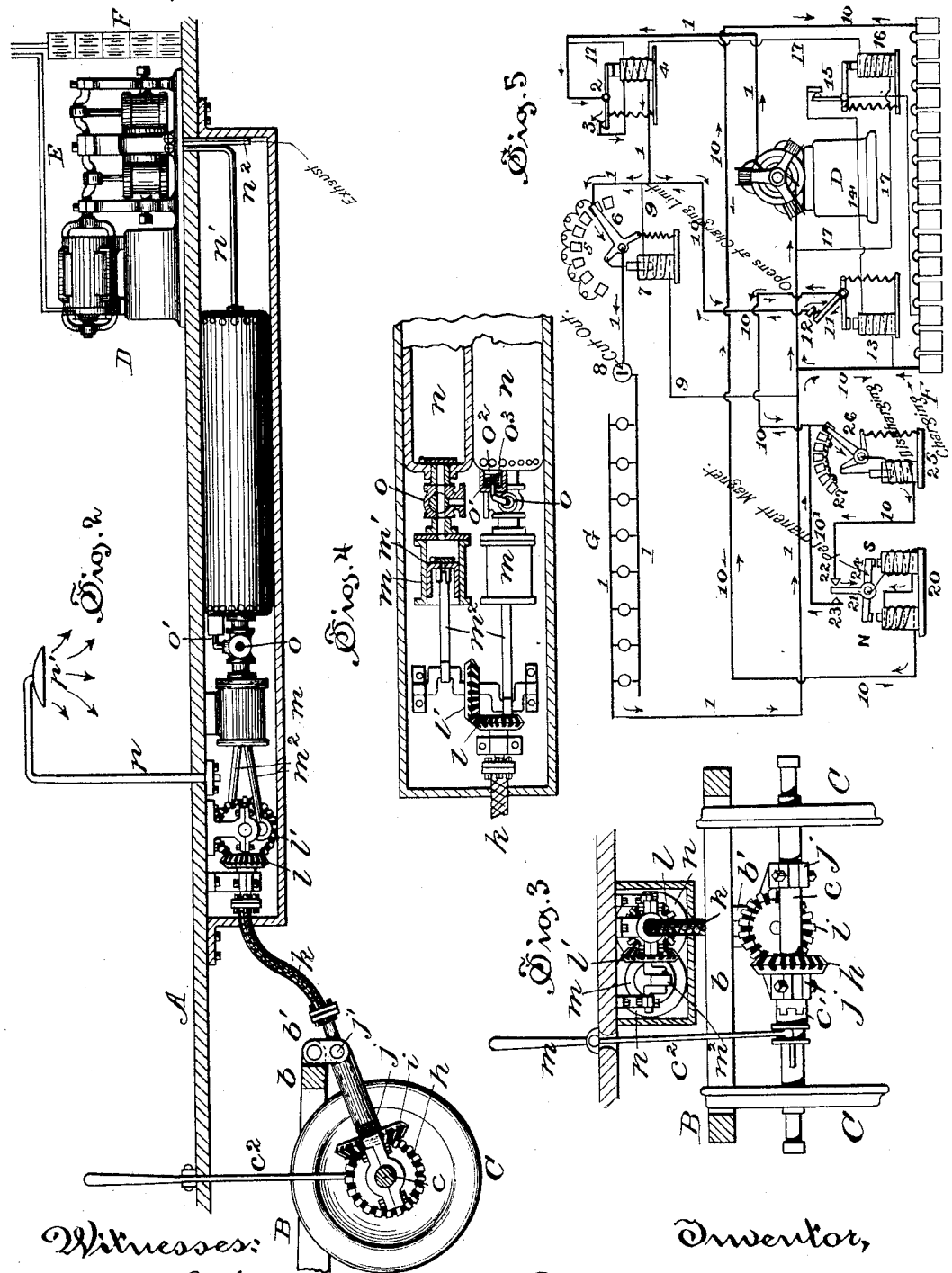

UNITED STATES PATENT OFFICE.

FRANK M. GARLAND, OF NEW HAVEN, CONNECTICUT, ASSIGNOR OF TWO-THIRDS TO NICHOLAS W. HUBINGER AND JOSEPH E. HUBINGER, BOTH OF SAME PLACE.

SYSTEM OF ELECTRIC LIGHTING.

SPECIFICATION forming part of Letters Patent No. 462,311, dated November 3, 1891.

Application filed September 9, 1890. Serial No. 364,408. (No model.)

*To all whom it may concern:*

Be it known that I, FRANK M. GARLAND, a citizen of the United States, residing at New Haven, in the county of New Haven and State of Connecticut, have invented certain new and useful Improvements in Systems for Lighting Vehicles, of which the following is a full, clear, and exact specification.

The invention relates to a system for lighting by electricity railway-cars and similar vehicles; and the object of the invention is to provide a simple isolated system for individual cars wherein the energy utilized is developed from the rotation of the axle of one pair of wheels and transmitted to a dynamic electrical generator, which automatically supplies the lighting energy directly when the car is in motion and which at the same time stores lighting energy for use indirectly when the car is stationary for an unusual length of time.

Referring to the accompanying drawings, Figure 1 is a side elevation of a railway-car with part broken away to show the interior. Fig. 2 is a detail vertical enlarged section of a portion of the car, showing the apparatus of the system. Fig. 3 is a detail end elevation of the same. Fig. 4 is a detail top view of a portion of the apparatus, part being in section. Fig. 5 is a diagram illustrating the electrical connections for automatically controlling the supply and expenditure of lighting energy.

In the views, the letter A indicates a railway-car having the usual trucks B and wheels C. In the car is placed an engine E, preferably an oscillating engine of the class shown and described in my application for patent Serial No. 360,653, and connected with this is an dynamic electrical generator D, preferably a dynamo constructed to run at low speed with the armature wound upon the shaft of the engine, forming the balance-wheel thereof. A few secondary or storage batteries F are located near the dynamo and are connected therewith and with the lamps G by the circuits hereinafter described.

To one axle $c$ a bevel-gear $h$ is secured, preferably by means of a clutch $c'$, having a lever $c^2$, which passes into the car for fastening or releasing the gear to set in motion or stop the mechanism of the system, and with this gear $h$ meshes a gear $i$, that is supported in a bracket $j$, the lower branched end of which encircles the axle, while the upper tubular end is held by trunnions $j'$ in a swinging bearing $b'$, attached to the frame $b$ of the truck to permit a vertical movement of the gears as the axle-boxes move upward and downward in the frame under the jar of the cars. The end of the shaft of the gear $i$ is coupled to a joint of flexible shafting $k$, that is coupled with a shaft supported in a bracket attached to the bottom of the car, in order that the truck may oscillate freely in rounding curves without straining the apparatus. A gear $l$ on this latter shaft meshes with a gear $l'$ on a shaft provided with one or more cranks, which are connected by rods $m^2$ with the pistons $m'$, that reciprocate in the air-pumps $m$ as the cranks rotate. The pistons, which are preferably cylindrical and provided with any suitable form of valve, are connected with one or more cylinders $n$, secured beneath the car.

From the cylinders leads a duct $n'$, that is connected with the expansion-chamber of the engine, from which open the inlet-ports to the cylinders, while the duct $n^2$ leads from the exhaust-ports of the engine.

In the connection between the pumps and the air-cylinders are placed valves $o$, adapted to be automatically opened when the pressure of air in the cylinders exceeds the desired limit, so that the pumps will stop forcing air into them. These valves are preferably three-way cocks, the spindles of which are rotated by rods $o'$, projecting from pistons $o^2$ in boxes open to the cylinders, so that when the pressure of air exceeds the torsion of the spring $o^3$ the cock is turned so as to open to the atmosphere, and when the pressure in the cylinders is sufficiently reduced the spring forces back the piston and opens the way to the cylinders and shuts it to the atmosphere. A casing tightly inclosing the air-pumping mechanism is secured to the bottom of the car to protect the mechanism from dust and dirt, and into this casing opens the exhaust from the engine, and also a tube $p$, which leads from a ventilator $p'$, located in the top of the interior of the car, so that the air utilized to run the engine may be drawn from the interior and serve to ventilate the car.

When the car is in motion and the gear $c$ clutched to the axle, the cranks are rotated through the medium of the flexible shafts and intermediate gears, and the pumps force air into the cylinders. When sufficient pressure is created in the cylinders, the air is allowed to escape through the engine and set it in motion. As long as the car is in motion the pumps can be operated to compress sufficient air in the cylinders and generate enough force to keep the engine running for a short time after the car has stopped. This turns the armature of the generator, which lights the lamps and charges the storage-batteries. When the air-pressure becomes reduced, the engine runs slow and the dynamo fails to generate sufficient electricity to light the lamps, the excess of electro-motive force of the storage-batteries closes a circuit, and the lights are lighted by the discharge of the batteries, and on the increase of the electro-motive force of the dynamo the batteries are automatically cut out and the lamps again lighted by the current from the dynamo. All extra current from the dynamo is allowed to pass into the batteries until they are fully charged, when they automatically cut themselves out and keep so until they are nearly discharged. By this system the lamps are lighted directly from the dynamo, which gives the most steady and satisfactory light and saves the handling and transportation of a large number of heavy storage-batteries, only a sufficient number being carried to furnish light during any unusually long detention, and those are automatically charged from the dynamo on the cars, and so do not have to be removed or handled, while no perceptible amount of extra power is required when the energy is developed from the axle of the moving cars.

The electrical connections for accomplishing this are as follows: The main circuit-wire 1 leads from the dynamo to the pivot of an oscillating lever 2, which is normally pulled by a spring away from the contact 3, from which the circuit-wire passes around the field-magnet 4, the armature of which is attached to the lever 2 on the opposite side of the pivot from the spring, so that when the current passing through the coils of the magnet is sufficient the contacts are joined, but when there is not sufficient current the connection is broken. The main circuit-wire passes from this magnet to a series of resistances 5, in contact with which is an oscillating lever 6, that is drawn in one direction to decrease the resistance by a spring and in the other to increase the resistance by the armature of a solenoid 7. From this lever the wire leads through cut-out 8 and lamps G, which are connected in any common manner, back to the generator. The solenoid 7 is wound by the coils of a shunt 9 across the main circuit around the resistance and lamps. A wire 10 leads from one of the batteries F, which are joined in the customary manner, around a pair of electro-magnets 20 to the lever 21, which is adapted to join contact 22 or 23 as the poles of the permanent bar-magnet 24 are attracted or repelled from the poles of the electro-magnets. From contact 22 wire 10 leads around solenoid 25 to pivot of lever 26, which moves over resistances 27 as the lever is pulled by the armature of the solenoid or the spring. A wire 10' connects contact 23 with wire 10, beyond resistance from which wire 10 passes to the pivot of a lever 11, which is oscillated by a spring in one direction to form a connection with a contact 12 and in the opposite direction to break such connection by a field-magnet 13. From this contact 12 the battery-wire leads to and is joined with the main circuit-wire 1 after it has left the field-magnet 4 and follows the same circuit until just before the main wire returns to the dynamo. The magnet 13 is wound by the coils of the shunt 14, that crosses from the terminal wire of the battery-circuit to one of the batteries near that terminal. This shunt-circuit is adapted to be opened or closed by the lever 15 as it is oscillated under the impulse of a spring or the field-magnet 16, which is wound by a shunt 17 between the terminals of the main dynamo-circuit. The shunt 17 is coiled around the field-magnet 4 in the same direction as the main wire 1.

When the dynamo is started, the current passes along the main wire 1 and across the shunt 17 back to the dynamo. The passage of the current through the coils of the magnet 4 in this shunt-circuit causes contact to be made between lever 2 and contact 3, which closes the main circuit through the lamps. A part of this current passes from the main circuit-wire to the battery circuit-wire 10 and through the batteries, which are thereby charged. Should the potential of the dynamo-circuit rise above the desired amount, the coils of the solenoid 7 in the shunt-circuit 9 throw more resistance into the main circuit and cause more current to pass into the batteries. When the potential of the dynamo-current is reduced below the desired degree, the main circuit is broken by the spring, which draws the lever 2 away from contact 3, and the lamps are lighted by the current from the batteries as they discharge. When the batteries are charged to the desired potential, the field-magnet 13 in the shunt-circuit 14 pulls down its armature on the lever 11 and opens the circuit between the batteries and dynamo at the contact 12, and when the batteries are discharged to the limit and the dynamo is not working the solenoid 7 releases its armature and allows the spring to pull the lever 6 from the resistance-contacts and open the circuit. When the current passes from the dynamo to the batteries, the armature of the solenoid 25 throws resistance into the circuit proportional to the strength of the current, so that the batteries cannot be destroyed by being charged too rapidly. As the current traverses the coils of the magnets 20 in the same direction, one of the poles attracts and the other repels the opposite poles of the permanent magnet 24, opening the circuit between lever 21 and contact 23, forcing the circuit to traverse the resistances when charging the batteries; but when the batteries are discharging the current traverses the coils of the magnets 20 in the opposite direction, reversing the poles and causing the permanent magnet to change its position and the lever to join with the contact 23, so that the current can travel wire 10' and not pass through the resistance in passing to the lamps.

I claim as my invention—

1. The herein-described system for lighting vehicles, which consists of an air-pump operated by the rotation of an axle of the vehicle, a motor operated by the air forced through the pump, a surrounding casing for said air-pump, a dynamic electrical generator connected with the motor, an exhaust-pipe establishing communication between said motor and surrounding casing, secondary batteries, lamps, the connection between the lamps, generator, and battery, and a ventilator projected within said vehicle and communicating with the casing surrounding the air-pump, whereby a continual circulation of air in the vehicle is maintained.

2. The herein-described system for lighting vehicles, consisting of a gear-wheel secured to an axle of the vehicle, a journal-sleeve having one end journaled on the axle and its other end pivotally supported by a link, a shaft journaled in said sleeve and provided with a gear-wheel meshing with the aforesaid gear-wheel, an air-cylinder, an air-pump communicating therewith, a crank-shaft journaled to the under side of the vehicle and provided with a gear-wheel, the piston-rods of said pumps connected to said crank-shaft, a flexible shaft having a gear at one end to mesh with the gear on the crank-shaft and secured with its other end to the shaft-support by the sleeve, a motor to be run by the compressed air, a dynamic electrical generator connected with the motor, secondary batteries, lamps, and the connection between the lamps, generator, and batteries.

3. The herein-described system for lighting vehicles, which consists of an air-pump operated by the rotation of an axle of the vehicle, a cylinder for receiving and storing the air forced through said pump, a motor operated by the compressed air, a pipe connecting the pump with the cylinder, a valve in said pipe, a valve-rod, a box communicating with the air-cylinder, a piston secured to the valve-rod and located in said box, counteracting spring for said piston, whereby the amount of air furnished to said cylinder may be regulated, a dynamic electrical generator connected with the motor, secondary batteries, lamps, and the connections between the lamps, generator, and batteries.

FRANK M. GARLAND.

Witnesses:
HARRY R. WILLIAMS,
ARTHUR B. JENKINS.